Jan. 1, 1935. W. C. SWIFT 1,986,303
METHOD OF WELDING COPPER
Filed March 31, 1934
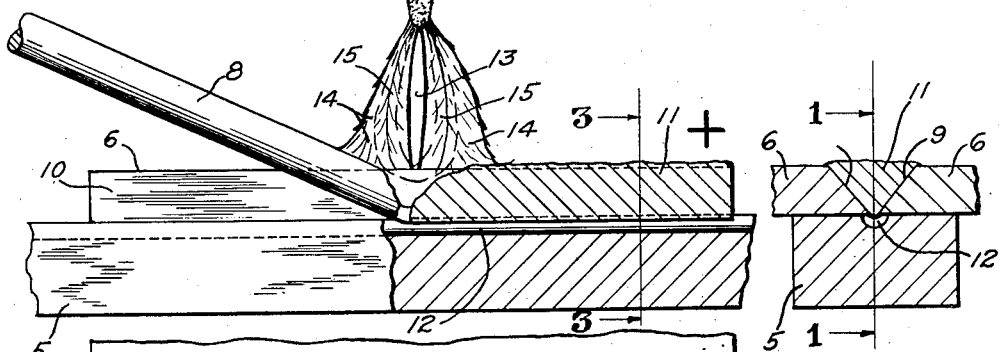
Fig. 1
Fig. 3
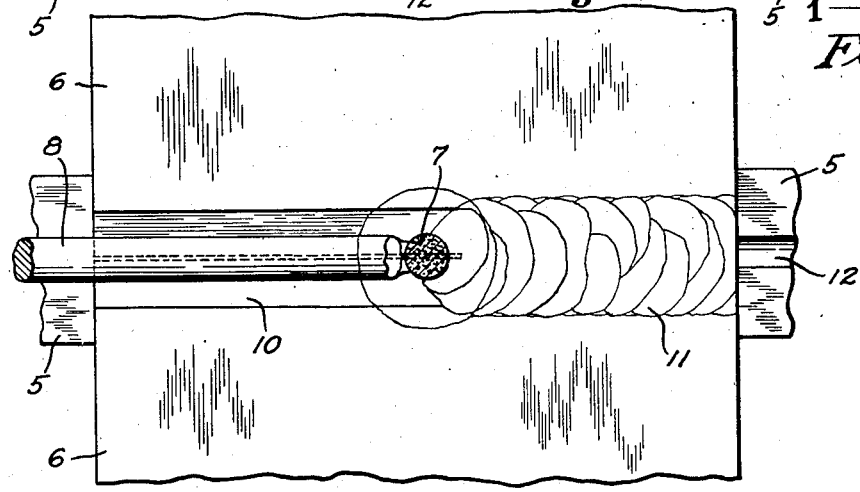
Fig. 2
INVENTOR
Willis C. Swift
BY
Wooster & Davis
ATTORNEYS.

Patented Jan. 1, 1935

1,986,303

UNITED STATES PATENT OFFICE 1,986,303

METHOD OF WELDING COPPER

Willis C. Swift, West Alexandria, Ohio, assignor to The American Brass Company, Waterbury, Conn., a corporation of Connecticut Application March 31, 1934, Serial No. 718,443

5 Claims. (Cl. 219—10)

This invention relates to an improved method of welding copper or alloys rich in copper, and has for an object to provide a method by which much stronger, tougher and denser welds between members of copper or alloys rich in copper can be secured than by the methods heretofore known, as a matter of fact to make welded joints as strong as the base metal.

It has been common practice to weld steel with a short arc using a voltage of from 18 to 25 volts, it being desirable to use a relatively short arc as a longer arc tended to give more oxygen and nitrogen in the weld and make it brittle. The tendency was therefore to shorten the arc going down to a voltage of around 20 volts so that with a metal arc the metal welding electrode was a very short distance from the base metal so the molten metal is in contact with the air and gases only a short time before it is deposited. For such work an arc of 1/8" to 3/8" is used, usually approximately 1/4" to 1/16". In welding steel the use of the welding rod as an electrode is satisfactory as the metal is deposited as a continuous stream of small particles.

However, in welding with a rod of copper or copper rich alloy as the electrode the metal is not deposited in such fine particles but as large globules of melted metal. It is also a curious thing in arc welding that the positive side of the arc develops approximately double the heat of the negative side of the arc. This adapts itself for the welding of copper because the heat conductivity of copper is so excellent that much more heat is needed in the base metal. As all carbon arc welding is done with the base metal on the positive side of the arc, the carbon arc may be used successfully in welding copper where metal arc welding would be an entire failure due to lack of sufficient heat in the base metal. It is therefore preferred to use a carbon arc in welding copper or alloys rich in copper and melt the weld metal from a rod into the joint by this arc. The voltage used heretofore has been the same as used for steel welding that is from 15 or 18 volts to approximately 25 volts and with an arc from 1/8" to 3/8" in length.

With this method it has not been possible to get satisfactory welds with copper or copper rich alloys, that is welds with the proper strength, although it has been possible to secure better and stronger welds when welding deoxidized copper than when welding non-deoxidized copper such as is known in the trade as "tough pitch" copper. Heretofore welded joints in non-deoxidized copper have only had in the neighborhood of one-half the strength of the base metal. This non-deoxidized copper or "tough pitch" copper is ordinarily electrolytic copper, although not necessarily so. My invention is, however, equally applicable to deoxidized copper or alloys rich in copper, although as indicated above much better joints have heretofore been made in welding deoxidized copper than in welding "tough pitch" copper, but my new method gives much better welds with deoxidized copper as well as "tough pitch" copper.

I have found that in using the short arc of 1/8 to 3/8 inches in length and with 15 to 25 volts for welding copper and copper rich alloys the weld was weak and porous. I found that with these short arcs the carbon monoxide formed a short distance from the carbon electrode is objectionable as it is readily soluble in the melted copper and as it is not soluble in solid copper it is thrown out when the copper solidifies making it porous. Thus the metal of the weld is much weaker than the base metal.

I, however, discovered that by using a much higher voltage and therefore a longer arc these objections were overcome in welding copper and alloys rich in copper, even in "tough pitch" copper, and that dense, strong welds were secured which were practically as strong as the base metal. Especially was this true where the copper weld rod contained a deoxidizer. I discovered that by using a carbon arc with current voltages of from approximately 40 to 55 volts arcs of from 1/2" to 1 1/2" in length could easily be maintained, but I preferably use arcs approximately 3/4 to 1 1/4" in length. With these long arcs the carbon gases, such as carbon monoxide which is formed a short distance from the carbon electrode, are in contact with the air a much longer time before reaching the molten metal so forms carbon dioxide which is not readily soluble in molten copper. This therefore prevents absorption of carbon monoxide by the molten metal to make it porous when the metal solidifies. It was observed that in welds made with these longer arcs the base metal adjacent the weld metal could be bent sharply without cracking, whereas with welds made with the short arc, if the base metal was bent adjacent the weld metal it would crack.

I am also not concerned in copper welding with the long carbon arc about the carbides in the copper as the carbon does not harden the copper.

I have found that the long arc gives a much wider blanket of carbon dioxide and nitrogen than the short arc so keeps the oxygen of the air from getting to the melted copper. Furthermore, with a long arc, for a given current value there is more heat generated than in a short arc. This, however, does not mean that the metal is more highly heated as the arc is spread over a greater area and therefore heats and is absorbed by a greater area. This permits the operator to carry the arc straight along the weld and he does not have to weave it back and forth which might cause exposure of melted metal to the air. As the filler rod or welding rod is melted, it forms a pool and the arc is played on this pool of metal.

As indicated two kinds of copper are generally available, the first being oxygen bearing or so called "tough pitch" copper. It has good electrical properties and is the easiest to get. The other is that in which a strong deoxidizer is used so the copper is oxygen free. There may be sufficient of the deoxidizer left in the copper so in heating at moderate heat no oxygen is taken up by the copper, or the copper may be oxygen free and contain no deoxidizer. Each kind is effectively welded by my long arc method above described with strong dense welds.

If we keep copper above approximately 950° C. and below its melting point for a length of time say 10 seconds the cuprous oxide gathers at the grain boundaries and makes it brittle. With long arc welding as described the heat of the arc is spread out more so the copper is not heated to as high a temperature and I get a weld which is practically the same strength as the base metal, while with a short arc there is danger of getting a weak weld. I found a short arc as above described causes the metal to boil or have a condition of turbulence because in such an arc the heat is so concentrated or localized that the flame has no chance to spread before the arc is completed on the weld metal, as in D. C. welding there is a tendency to form a crater or arc to spread out on the positive side but to burn to a point on the negative or carbon electrode.

Therefore as the arc is short there is no chance for it or the flame to spread as in the long arc as described. It is desirable that the positive pole or electrode be the base metal or elements being welded but we also want the flame to spread out over the adjacent metal and the long arc permits this. There is a limit as to how far back we should go with it but we can control it by rate of progress along the weld or seam and the current in the arc. If we heat back too far or if the copper is heated to near the fusion point and held for an appreciable length of time then oxide segregations are likely to occur in the copper adjacent the weld and we have weakened welds. This does not bother in deoxidized copper, but is troublesome in welding "tough pitch" copper which contains cuprous oxide. This weakening of the metal by segregation of the oxides is much more likely to happen with a short arc but can be avoided much more easily with a long arc as we are much less likely to get overheating of the copper with a long arc. Whenever we touch copper with a short arc we get melting at the surface.

I have illustrated the effect of this long arc in the accompanying drawing in which Fig. 1 is a partial side elevation and partial longitudinal section showing the relation of the arc to the members being welded and the weld metal, the section being substantially on line 1—1 of Fig. 3;

Fig. 2 is a top plan view thereof; and

Fig. 3 is a transverse section substantially on line 3—3 of Fig. 1.

In the drawing 5 represents a backing bar of suitable electrical conducting member, such as copper, to which members 6 to be welded are clamped on its top surface. The positive lead (not shown) from the direct current supply is clamped to this backing bar, while the negative lead is connected to the carbon electrode 7. The welding rod which supplies the weld metal melted into the weld or seam is indicated at 8. The adjacent edges of the members 6 are beveled as shown at 9 and they are clamped with these edges a short distance apart forming a tapered groove 10 into which the weld metal is melted by the arc at the same time the walls of the bevel and metal adjacent thereto are heated to secure the proper bond between the base metal and the weld metal. A section of the finished weld is shown at 11. The top wall of the backer is provided with a longitudinal groove 12 under the adjacent edges of the members 6 so a portion of the weld metal may run through the slot between the edges without attaching itself to the backer bar.

It will be seen that the long arc is composed of several zones. The arc core is shown at 13 and represents a zone rich in volatilized carbon. The arc flame indicated at 14 is a zone rich in carbon dioxide and it will therefore be seen that the part of the arc in contact with the work as well as the outside envelope of the arc is largely carbon dioxide, while the carbon monoxide zone 15 or zone rich in carbon monoxide is largely within the arc itself and not in as intimate contact with the work as would be the case were the carbon held to give a short arc.

These zones are not clearly defined and no one constituent is found solely in any one zone. Probably all three constituents are to some extent in each of the three zones, and between zones 14 and 15 there is a zone rich in both carbon dioxide and carbon monoxide, but with the long arc, with a given heat liberation, the atmosphere against the molten metal is much richer in carbon dioxide and poorer in carbon monoxide than the arc atmosphere of a short arc in which the heat liberation is identical. This long arc releases a larger amount of energy in the form of heat than do the arcs customarily used in the welding of steel and similar materials. This heat energy input is sufficiently great to exceed the capacity of the base metal copper to conduct it away. This is one of the important conditions for successful welding by this method. Also the long arc spreads out much more than the short arc so the heat is not so concentrated with less danger of overheating the metal as above described. In other words, there are material advantages in the long arc over the short arc which give much stronger and better welds as above described. In fact welds can be readily made even in "tough pitch" or non-deoxidized copper which are practically as strong as the base metal.

Various alloys may be employed for the weld rod, but I have found that for welding copper a phosphor bronze welding rod, composed principally of copper and containing tin and phosphorus, makes very much the best and strongest weld. These rods may be of an alloy of from approximately 4% to 15% tin, phosphorus .01% to 2% with the remainder copper. The preferred range of tin is approximately 7% to 12%. A specific rod found to be very satisfactory is approximately 89½% copper, 10½% tin and phosphorus .02% to .10%. Also similar rods using the same amount of phosphorus with approximately 5% tin, also 8% tin and 10% tin. This alloy has about the right amount of phosphorus so that the metal is thoroughly deoxidized at all times while being fused. The lower melting point of these phosphor bronze rods, over that of copper, is also an advantage as they are more fluid and more readily take to the copper even though the copper is not really melted.

Good strong welds were secured with each of these rods, but there was a marked superiority in all respects as the tin content was increased. If the tin is as high as 15%, the rod will not be workable as it is brittle and will be liable to break. It is also difficult to roll or draw but rods up to this content of tin can be cast. Alloys with less tin can be rolled and worked.

A rod of copper deoxidized with silicon was found to be very satisfactory as was also this rod dipped in molten tin. A rod of an alloy of approximately 96% copper, 3% silicon and 1% manganese was also satisfactory.

Thus with my long arc welding for welding "tough pitch" and deoxidized copper and also alloys rich in copper, that is of at least 90% copper, the copper-tin-phosphorus alloys noted above are preferred, but I can secure satisfactory results with a number of other alloys. Thus I can also use silicon bronze as copper-silicon alloys containing modifying elements such as manganese, tin, and so forth. I can use copper silicon alloys with up to 6% silicon, or copper alloys carrying 6% or less of silicon and one or more modifying elements.

For example, a very good alloy for this purpose is a copper-silicon-manganese alloy containing from .1% to 6% silicon, and .01% to 3% manganese with balance copper. Also a copper-silicon-zinc alloy containing 6% or less silicon, not more than 5% zinc and balance copper can be used.

These rods can also be used satisfactorily in welding members made of alloys rich in copper, say for example, alloys containing copper in the neighborhood of 90% or more.

Having thus set forth the nature of my invention, what I claim is:

1. A method of welding copper or alloys rich in copper comprising striking an arc from approximately one-half to 1½ inches in length between a carbon electrode and the base metal to be welded and with this metal as the positive electrode, and melting into the joint by said arc a copper base alloy containing a deoxidizer.

2. A method of welding copper or alloys rich in copper comprising striking an arc from approximately one-half to 1½ inches in length and with a voltage of from 40 to 55 volts between a carbon electrode and the base metal to be welded and with this metal as the positive electrode, and melting into the joint by said arc a weld metal rich in copper.

3. A method of welding copper or alloys rich in copper comprising striking an arc approximately three quarters to one and one quarter inch in length between the base metal and a carbon electrode and with the base metal as the positive electrode, and melting into the joint by said arc a weld metal rich in copper.

4. A method of welding copper comprising striking an arc from the metal with a carbon electrode and sufficient voltage to produce an arc of approximately ½ to 1½ inches in length, and melting into the joint by said arc a metal rod comprising copper containing a deoxidizer.

5. A method of welding copper or alloys rich in copper comprising striking an arc from approximately one-half to one and one-half inches in length between a carbon electrode and the base metal to be welded and with the carbon as the negative electrode, and melting into the joint by said arc a weld metal rich in copper.

WILLIS C. SWIFT.